Sept. 28, 1943.  H. HOOVER, JR., ET AL  2,330,216
APPARATUS FOR SEISMIC PROSPECTING
Filed Jan. 30, 1939   2 Sheets-Sheet 1
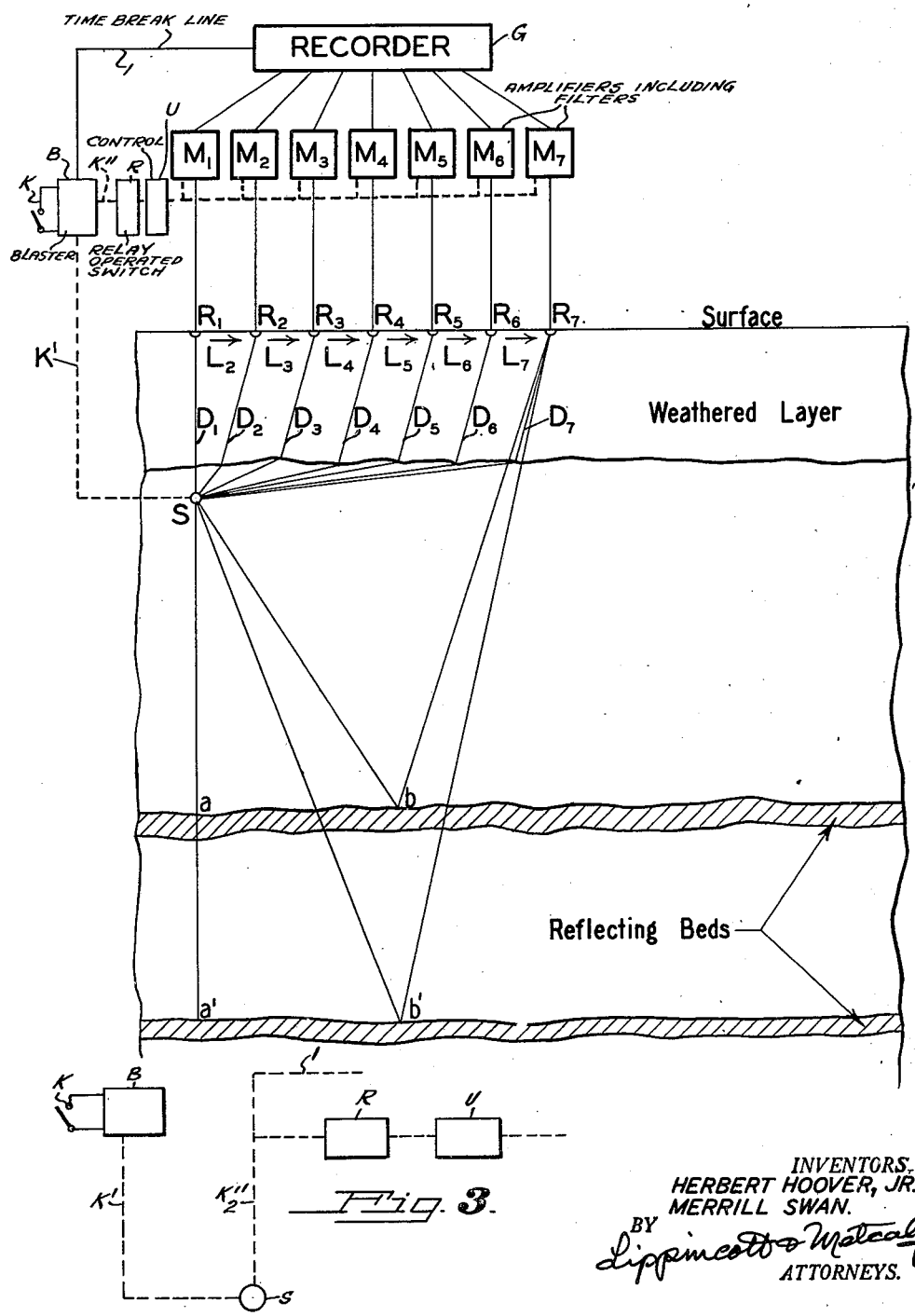

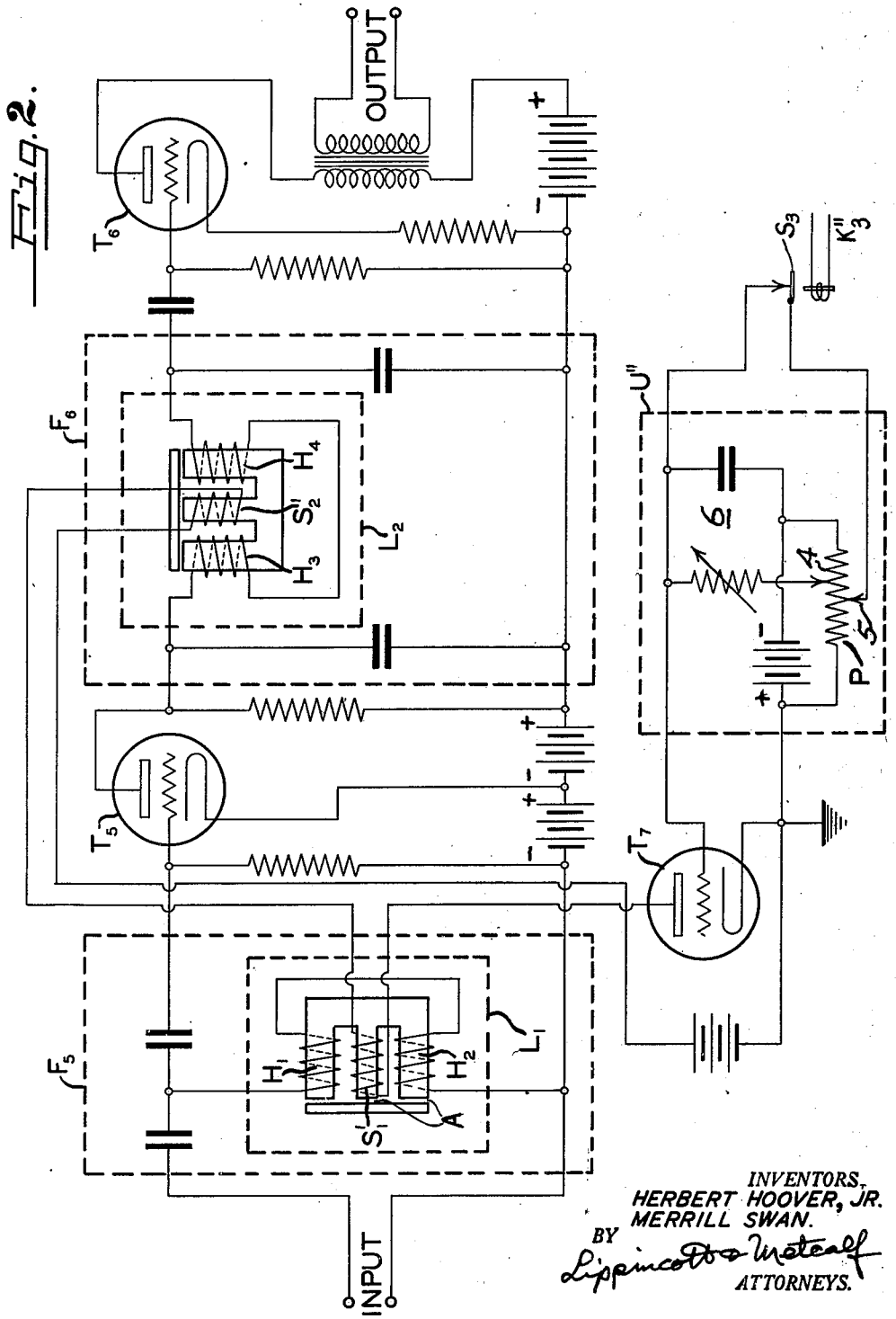

Patented Sept. 28, 1943

2,330,216

UNITED STATES PATENT OFFICE 2,330,216

APPARATUS FOR SEISMIC PROSPECTING

Herbert Hoover, Jr., Sierra Madre, and Merrill Swan, Pasadena, Calif., assignors, by direct and mesne assignments, to Consolidated Engineering Corporation, Los Angeles, Calif., a corporation of California Application January 30, 1939, Serial No. 253,488

4 Claims. (Cl. 177—352)

Our invention relates to wave translating systems whose frequency response characteristics vary as functions of time, and is particularly applicable to seismic prospecting and other signalling systems in which the frequency range of the desired waves received, varies as a function of time.

Among the objects of our invention are: To provide for varying the characteristic of a filter or an amplifier as a function of time; to make possible the variation of the frequency response of an electrical network in a predetermined manner; to provide a seismic wave translating system in which the frequency response characteristic of said system varies as a function of time; to make provision for the recording of reflections of seismic waves from various strata through channels of variable frequency response characteristics but optimum for different sections of the seismogram; and to provide a receiving system for seismic prospecting in which reflected waves received from the same geological stratum at successive set-ups along a line of exploration, may be recorded with substantially the same frequency response characteristic of the receiving system at the respective times of reception of waves from said stratum at the successive set-ups.

Our invention possesses numerous other objects and features of advantage, some of which, together with the foregoing, will be set forth in the following description of specific apparatus representing a preferred embodiment of our invention.

Referring to the drawings:

Fig. 1 is a schematic diagram used in explaining the need of our invention in seismic prospecting.

Fig. 2 is a diagram of a preferred embodiment of our invention.

Fig. 3 is a schematic diagram illustrating a manner of initiating a time break indication on a record.

In Fig. 1 we have illustrated schematically a conventional set-up used in seismic exploration. When a key K is closed, artificial seismic waves are generated by detonation of an explosive at a point S below the surface of the ground, preferably just below the weathered layer. At the instant of detonation a mark known as the time break is made by a string galvanometer in the recorder.

Seismic waves propagated in all directions from the source S are returned from various discontinuities, such as those labeled "reflecting beds" in the figure, within the earth and detected by receptors, or other suitable vibration detecting devices, $R_1 \ldots R_7$, preferably placed in a line on or near the surface of the earth. Electrical waves produced by the receptors in response to the waves received are amplified by the amplifiers $M_1 \ldots M_7$, and recorded as traces on a record strip by the multiple-string galvanometer in the recorder G. From a study of such records valuable information regarding the geological structure explored, is revealed.

Some of the first waves to be recorded are those traveling substantially horizontally from the source S and refracted upward to the receptors along paths such as $D_1 \ldots D_7$. The times of transmission of these waves from the source, as determined from the record, is used in the determination of the thickness of the weathered layer. In order to make possible accurate weathering corrections it is desirable to record the instant of arrival of these waves as distinctly as possible. To do this, when the receptors are reasonably close to the shot point the receiving system is generally made most sensitive to high frequency components of the waves of, say, 50 cycles or over.

Waves propagated downward from the source S are partially reflected by subterranean beds, as at $a$, $b$, $a'$, and $b'$, the reflected waves being returned to the receptors and being detected by the receptors $R_1 \ldots R_7$. Due to causes not fully understood we have observed that the waves recorded late on the record, corresponding to reflections from deep strata, are usually of lower frequency than the waves recorded early on the record, corresponding to reflections from shallow strata.

For example, in the early portion of the record the dominant frequency of the reflected waves may be about 50 to 100 cycles per second, while those received from three to five seconds or more after the detonation are generally of lower frequency, sometimes about 20 to 40 cycles per second. During the reception of the waves we have found, in general, a gradual shift in the spectrum of the reflected waves from high frequencies to low frequencies.

Generally, in the early and intermediate portions of seismic records, there are present low frequency waves known as "ground roll." These waves travel with low velocity at or near the surface of the earth and may have frequencies of about 30 cycles per second or less.

Ordinarily, recordings of the ground roll are not desired. Ground roll effects may be partially eliminated by combining outputs of appropriately spaced receptors or by other methods. By the application of our invention herein to be described, these undesired effects may be reduced still further.

Other waves besides ground roll which are undesirable, and ordinarily affect the receptors during recording, are due to wind, traffic, livestock, etc. These disturbances, known as "unrest," are generally of higher frequency than the desired waves. Whenever the amplitude of the desired reflected waves is small compared with the amplitude of existing unrest, the unrest will sometimes mask the reflected waves completely unless proper precautions are taken to filter it out. Due to the fact that the later desired reflections are generally of low frequency compared to the unrest, the desired reflections may be emphasized and the unrest made less objectionable by discriminating against the high frequencies as compared with the low frequencies in the later portions of the record. Some unrest is of very low frequency, and the effects thereof also may be reduced by taking proper precautions in accordance with the instant invention.

From the above discussion of seismic prospecting it is readily seen that it is often desirable to provide a filtering system which emphasizes high frequency components in the early portion of a seismic record, only the low frequency components at the end of the record and intermediate frequency components at intermediate parts of the record. Under some conditions emphasis on waves of various frequency groups may be desirable in other time sequences. Our invention may be readily adapted to such cases by those skilled in the art.

We have found that both the intensity and the dominant frequency of the reflected waves recorded in seismograph exploration generally diminishes with seismic wave travel time. We accordingly prefer to vary the frequency vs. amplitude response characteristic as a function of seismic wave travel time; and to simultaneously vary the net overall amplification in any suitable manner.

Broadly, according to our invention the relative sensitivity of the receiving system to various frequency components of the seismic waves is to be proportioned in any manner suitable to bring out character of the recorded waves favorable to ready interpretation of the record. The shape of the frequency response characteristic may be varied on the high frequency side or on the low frequency side, or on both sides as a function of seismic wave travel time, according to the particular requirements of various geographic areas under investigation. The variation may be made continuously or in steps. By seismic wave travel time we mean the time elapsed between the initiation of the seismic waves and their reception, or any time corresponding thereto.

In using our invention the frequency vs. amplitude response characteristic of a wave translating channel may be controlled independently of the amplitude of the received waves, thereby making feasible, recording through a plurality of channels of like characteristics simultaneously. Other advantages of our invention will readily appear to those skilled in the art.

Our invention is illustrated broadly in Fig. 1. In the form of our invention illustrated here the key K, connected to blaster B, is closed to detonate a charge of explosive at the shot point S through a connection K'. At the same time an electrical impulse is transmitted from said blaster B to a relay operated switch R according to principles long known in the art. Said impulse actuates relay R to set into operation a frequency vs. amplitude control unit U, which operates in such a manner as to control the frequency vs. amplitude characteristic of each of the amplifiers $M_1$, $M_2$ ... and $M_7$. In this form of our invention the frequency vs. amplitude characteristic of the amplifiers $M_1$, $M_2$ ... and $M_7$ are all varied simultaneously as a predetermined function of the seismic wave travel time of the received seismic waves, or in other words, as a predetermined function of the time elapsed between the instant at which the waves are detonated at shot point S and the time at which the received seismic waves pass through the respective amplifiers to the recording elements of the recorder G. A specific form of our invention is illustrated in detail in Fig. 2.

In Fig. 2 we have illustrated a preferred type of network applicable to our invention. This network includes an amplifier stage, in the grid and plate circuits of which are connected variable high and low pass filters $F_5$ and $F_6$, respectively. Except for the variable features pointed out below these filters are of a conventional type whose characteristics will be clear, from the diagram, to those skilled in the art.

For inductance elements filters $F_5$ and $F_6$ utilize variable inductances $L_1$ and $L_2$. As illustrated here, each inductance element $L_1$ and $L_2$ comprises pairs of reactors $H_1$, $H_2$ and $H_3$, $H_4$ on the outside branches of three-legged magnetic circuits. On the center leg of each magnetic circuit are control windings $S_1'$ and $S_2'$ through which control currents flow. Said control currents are preferably in the form of D. C. currents.

The inductance element $L_1$ of the filter $F_5$ comprises the reactors $H_1$ and $H_2$. A direct current through the corresponding control winding $S_1'$ produces magnetic flux which links the two reactors $H_1$ and $H_2$. Said flux causes variation of the incremental permeability of the magnetic material constituting the core of said inductance $L_1$, and thereby varies the reluctance of the magnetic circuit and hence the inductance of the reactors.

The control winding $S_1'$ and the reactor windings $H_1$ and $H_2$ are so wound that there is substantially zero mutual inductance between the circuit containing the control winding $S_1'$ and the circuit containing the reactors $H_1$ and $H_2$. The two reactors $H_1$ and $H_2$ connected in series with a positive mutual inductance between them forms the inductance $L_1$ of the filter $F_5$. Since these two reactors $H_1$ and $H_2$ have the same inductance values the transformer action between the control winding $S_1'$ and said inductance $L_1$ has the desired zero value.

The inductance element $L_2$ is constructed similarly to inductance element $L_1$.

Preferably the reactors have inductance values which are substantially independent of the amplitude of the signal currents passing through them, and are substantially single valued functions of the currents in the control windings. For this reason the magnetic circuit of each reactor is preferably made of a material which has high permeability and low coercive force, and is preferably provided with an air gap of suitable dimensions. In the system here illustrated an I-section of the core is positioned adjacent the ends of the legs on the E-section of the core. Since the flux from reactor $H_2$ passes through the leg of the E-section on which it is wound and the center leg but not the leg on which reactor H₁ is wound, the effective air gap for reactor H₂ is determined by the air gap A between I-section and the two legs of the E-section through which flux from the reactor H₂ passes. The effective air gap of the entire inductance which includes the two windings H₁ and H₂, is formed by the air gaps between I-section and the legs of the E-section.

A convenient way to vary the current through the control windings S₁' and S₂' is to connect them in series in the plate circuit of a low resistance vacuum tube T₇, as shown. The current in the plate circuit of tube T₇ may be controlled readily by varying its grid potential.

Using the control circuit U" shown in Fig. 2, the initial and final grid potentials, and the corresponding currents in the plate circuit of the tube T₇, depend upon the settings of the contacts 4 and 5 on the potentiometer P. If the relay S₃ has previously been closed, and is then opened by means of an electrical impulse transmitted over the line K₃", the rate at which the control current changes depends on the time constant of the RC circuit 6. Using the potentiometer potential settings shown in which the final negative potential on the grid 4 of the control tube T₇ is larger than the initial negative potential on said grid 4, the control current will decrease as a function of time following the instant at which the relay S₃ is opened. The values of inductance will increase in a corresponding manner, and consequently the range of maximum sensitivity of the amplifier will shift to lower and lower frequencies as a function of time. The time constant of the RC network 6 may vary over a wide range depending upon the manner in which the frequency characteristics of the returned reflected waves vary in the geographic area which is being explored. Since the time interval during which reflected waves are ordinarily received may lie anywhere from about one tenth second to eight seconds, the time constant of the RC network 6 likewise may be selected at a value from about one half to eight seconds. However, it is to be understood that the actual time constant selected is not limited to the foregoing values and is under the complete control of the operator and may be determined by him empirically to give the most suitable record in the region under investigation by simply establishing suitable values of the resistance and the capacitance which comprise the RC network 6.

Using the circuit illustrated in Fig. 2, operating under the conditions explained hereinbefore, the sensitivity of the seismic wave translating channel gradually increases as a function of time simultaneously with the shift of maximum response to lower frequencies.

It will be obvious to those skilled in the art that a resistance and capacity network may be substituted for the reactor circuits F₅ and/or F₆, and the values of either or both altered to obtain the desired variation in frequency response.

In Fig. 2 only the simplest type of control circuit are shown. Frequently it so happens that more flexible control of the filter characteristics are desired. Those skilled in the art can readily provide means with which it is possible to vary the frequency response of a wave translating system as a function of seismic wave travel time in any desired manner whatsoever.

It will be noticed that the networks described are set in operation by closing a key connected to a blaster B. Inasmuch as it is desirable that the variable condition of the network be in operation during reception of waves initiated by the usual type of shot, i. e., an explosion of dynamite or similar explosion, the key K or switch S₃ can be operated simultaneously with the operation of the blaster B as shown in Fig. 1, or can be operated by time delay devices started by the detonating current, or equivalent energy derived from the shot itself as illustrated schematically in Fig. 3. In this case when the key K is closed the blaster B communicates an energy impulse to the explosive at shot point S through the line K'. When the explosive at shot point S is detonated, it breaks a connection in the line K₂" connected to the input of the relay switch R. This in turn sets into operation the control unit U which acts to vary the frequency vs. amplitude characteristic of each of the amplifiers in the seismic prospecting receiving and recording system. In any case, the relay S₃ shown in Fig. 2 is actuated by an electrical impulse transmitted over the connection K₃" at the input of the relay, which input may be directly connected to blaster B as shown in Fig. 1 or to the shot point S as shown in Fig. 3.

In the set-up shown in Fig. 1, the time break is recorded by means of an electrical impulse transmitted over line I from the blaster B to a recording element in the recorder G; in the set-up shown in Fig. 3, the time break is recorded by means of an electrical impulse derived from line K₂" at the instant the explosion occurs. Such systems for producing time breaks and for transmission of impulses from blasters are well known to those skilled in the art and need not be described in detail here. In our system the same or similar impulses are used to initiate the operation of our frequency vs. amplitude control unit U.

While we have described one network which is especially applicable when our invention is applied to seismic prospecting, other uses and other networks will readily appear to those skilled in the art.

It is well known in the art that seismic prospecting is conducted by successively shooting records at different set-ups. By a set-up is meant a particular shot point used in conjunction with a particular set of receptors positioned at the earth's surface as illustrated in Fig. 1. By varying the frequency vs. amplitude response characteristic of the receiving system as a predetermined function of seismic wave travel time, and by utilizing the same time functions at each of a plurality of related set-ups, we are able to make certain that related waves from the same beds recorded at the different set-ups always have the same wave form.

The desired variation of frequency response may of course be obtained by varying the characteristics of the receiving or reproducing element, as well as the intermediate network of the wave translator, and such control will be deemed fully equivalent to the embodiment shown and described.

We claim:

1. In seismic prospecting apparatus for reproducing and recording a train of reflected seismic waves in which there is a gradual shift in the spectrum of the reflected waves from high frequencies to low frequencies during the wave reception, having a receptor for converting the seismic wave train into a corresponding electrical wave train having the same frequency components, the combination of an electrical wave amplifier having an input and output and capable of passing a band of said electrical waves therethrough, a filter intermediate the input and output of the amplifier, a variable inductance serving as a filter element, said inductance being in the form of a reactor wound on a magnetic core, a control winding also wound on the core, a current supply device connected in series with the control winding, and current control means connected with the current supply device to vary the current supplied to the control winding as such a function of time as to shift the maximum sensitivity of the amplifier to lower and lower frequencies as a function of time during the amplification of the electrical waves.

2. A filter element for a seismic amplifier comprising a saturable core reactor having two magnetic circuits with a common branch, a reactance winding around a portion of each of the circuits outside of the common branch, the two reactance windings being serially connected with a positive mutual coupling, a core saturation control winding on the common branch coupled oppositely to the two reactance windings, whereby there is no mutual inductance between the control winding and the reactance formed by the serially connected windings, and a variable current supply source connected in series with the control winding for varying the degree of saturation of the core and current control means associated with the current supply source for varying the control winding current as a predetermined function of time independently of the amplitude of any current flowing through the reactance windings.

3. In seismic prospecting apparatus for reproducing and recording a train of seismic waves in which there is a change in the spectrum of the waves during the wave reception, and having a receptor for converting the seismic wave train into a corresponding electrical wave train having corresponding frequency components, the combination of an electrical wave amplifier, a filter in the amplifier, a variable inductance serving as a filter element, said inductance being in the form of a reactor wound on a magnetic core, a control winding also wound on the core, a current supply device connected in series with the control winding, and current control means connected with the current supply device to vary the current supplied to the control winding as a predetermined function of time so as to vary the frequency of maximum sensitivity of the amplifier as a function of time during the amplification of the electrical waves.

4. In apparatus for seismic prospecting, a filter element comprising a saturable core reactor having a magnetic circuit, a reactance winding around a portion of the circuit, a core saturation control winding around a portion of the circuit, a variable current supply source connected in series with the control winding for varying the degree of saturation of the core, and current control means associated with the current supply source for varying the control winding current as a function of time.

HERBERT HOOVER, JR.
MERRILL SWAN.